United States Patent
Rathfelder

[15] 3,655,279
[45] Apr. 11, 1972

[54] MICROFICHE SUPPORTING AND POSITIONING APPARATUS

[72] Inventor: Siegfried F. Rathfelder, Brooklyn Center, Minn.

[73] Assignee: Minnesota Mining and Manufacturing Company, St. Paul, Minn.

[22] Filed: Dec. 23, 1968

[21] Appl. No.: 786,072

[52] U.S. Cl. ................................................353/27, 355/40
[51] Int. Cl. .................................................................G03b 23/08
[58] Field of Search..........................95/36; 353/27; 355/40

[56] References Cited

UNITED STATES PATENTS

| | | | |
|---|---|---|---|
| 2,260,551 | 10/1941 | Boni | 353/27 |
| 2,701,979 | 2/1955 | Pratt | 353/27 |
| 3,361,031 | 1/1968 | Stroud | 353/27 |
| 3,535,032 | 10/1970 | Hopper | 353/27 X |
| 949,084 | 2/1910 | Murray | 355/84 |

FOREIGN PATENTS OR APPLICATIONS 693,234   3/1962   Canada..................................353/27

Primary Examiner—Samuel S. Matthews
Assistant Examiner—Monroe H. Hayes
Attorney—Kinney, Alexander, Sell, Steldt & Delahunt

[57] ABSTRACT

A microfiche supporting and positioning apparatus for use with a reader and/or printer and comprising a plurality of relatively movable frames, one of which supports the microfiche, to readily and precisely position the microfiche at a predetermined position. The apparatus includes means mounting said frames for free-floating movement with respect to each other or for vernier-type movement relative to each other.

4 Claims, 5 Drawing Figures

MICROFICHE SUPPORTING AND POSITIONING APPARATUS

The invention herein described was made in the course of or under a contract with the Department of the Army.

This invention relates to the holding and positioning of cards readily and precisely at a predetermined position, and in one aspect relates to the holding of microfiche cards relative to an optical axis or the axis of a light projection system in a reader and/or printer.

The apparatus of the present invention provides a device having a multiplicity of relatively movable frames and associated releasable gear members affording free-floating relative movement of the frames or vernier movement of the frames along perpendicular axes for the rapid and precise positioning of a microfiche. One aspect of the present invention is also the arrangement of said gear members such that actuation of a single lever will separate the associated gears affording the vernier-type movement between all of the frames to afford the free-floating movement between frames.

A microfiche as used herein refers generally to a thin, flexible transparency upon which are a plurality of images disposed in columns and rows, said transparency having a size, for example, of 4 inches by 6 inches and capable of holding 84 or more images. This microfiche must be moved relative to the axis of a projection system, including a source of light and a projection lens, such that enlarged light images from the images on the transparency may be projected upon a screen or film.

The prior art teaches the use of supporting apparatus in readers and/or printers for microfiche which permit relatively free-floating movement of a carriage relative to the optic axis or which teach handling equipment utilizing vernier-type movement for the carriage relative to the optic axis. The prior art however does not teach an apparatus permitting free movement of the carriage and when desired, vernier-type movement of the carriage relative to the optic axis along both the X and Y axes of the carriage. Examples of the above-referred-to prior art include French Pat. No. 1,430,277, delivered Jan. 24, 1966; U.S. Pat. No. 3,267,801, issued Aug. 23, 1966; and U.S. Pat. No. 3,224,326, issued Dec. 21, 1965.

The present invention has the advantage over the prior known devices in that it provides an apparatus for handling the microfiche relative to the optical axis in such a manner that by a single control member the multiple frames of the apparatus may be moved readily relative to each other and to the optical axis to position an image on the microfiche generally in the desired position. The control member may then be released to permit further careful adjustment by manually operated knobs for precise positioning of the microfiche along perpendicular axes to assure precise placement of an image on the microfiche in alignment with the optical axis to afford projection of a light image.

The microfiche handling and positioning apparatus of the present invention is adapted for use with a projecting means and comprises a support frame which may be part of the projecting means, e.g., a transparency reader and/or image printing device, a first frame mounted on the support frame for movement along one axis, a second frame adapted to support a card and mounted on said first frame for movement relative thereto along a second axis perpendicular to said first axis, gear means on said support frame, said first frame and said second frame affording precise relative movement and control of said frames upon operation of said gear means, manual means for operating said gear means, and manual means for disabling said gear means affording free-floating movement between said plurality of frames.

The advantages and novel features of the present invention will become more apparent upon reading the following detailed description of the invention which relates to the accompanying drawing wherein.

Figure 1:
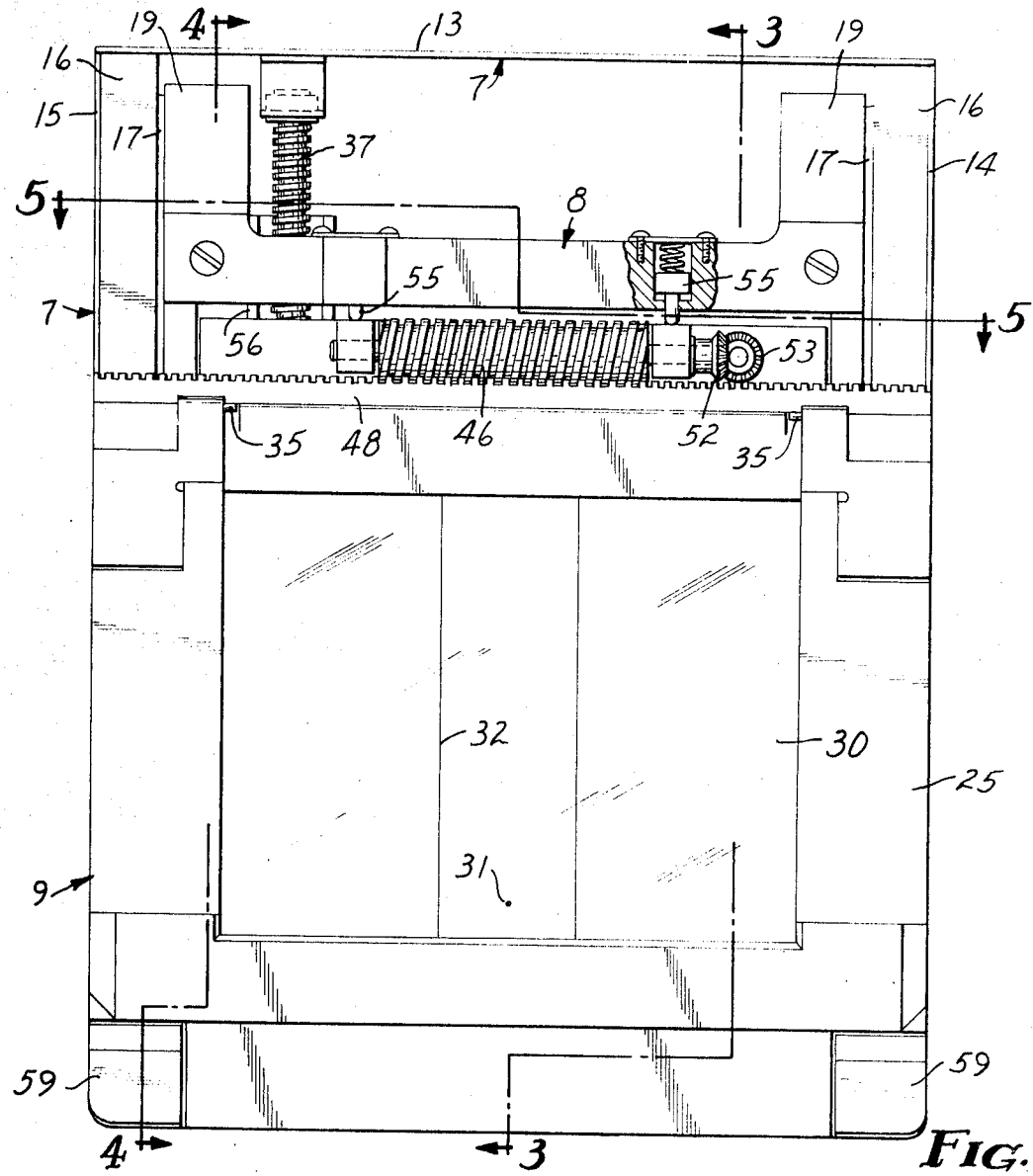
FIG. 1 is a plan view of the card-handling and positioning apparatus formed in accordance with the present invention.

Referring now to the drawings, there is shown in FIG. 1 an apparatus constructed according to the present invention which is adapted for use in a microfilm reader and/or printer. The apparatus includes three basic frame members, each relatively movable with respect to the others.

The multiple frames of the apparatus comprise a support frame 7, a first longitudinally movable frame 8, and a second movable frame 9 supported on frame 8 and movable therewith or transversely thereto. The support frame 7 as illustrated comprises a base member 11, a front plate member 12, a rear plate 13, and transversely spaced longitudinally extending side plates 14 and 15.

Figure 3:
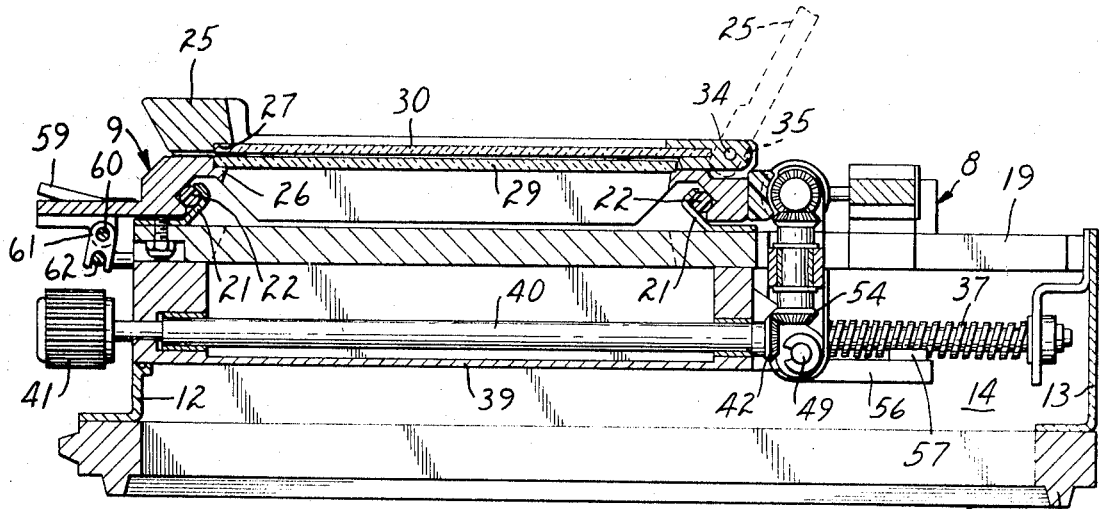
FIG. 3 is a vertical longitudinal sectional view through the apparatus of FIG. 1 generally along the line 3—3 of FIG. 1.

The side plates 14 and 15 support guide members which cooperate with guide members on the frame 8 to permit relative movement between frames 7 and 8 along the longitudinal axis of the apparatus which is hereinafter referred to as the "Y" axis. The guide members secured to frame 15 include spaced opposed parallelly extending race members or races 16 which engage and support a circular rail 17 formed of a smooth polymeric material such as nylon. In opposed relation to each of the races 16 and mounted on the frame 8 are guide or race members 19 which are also formed with a groove to engage the rails 17. The races 19 are positioned on transversely opposite sides of the support frame 8 and support it from frame 7 via the rails 17. Supported upon the upper surface of the frame 8 are brackets or races 21 (see FIGS. 3 and 4) which are parallel and longitudinally spaced relative to each other extending transversely of the apparatus. These races 21 support rails 22 which are similar to the rails 17 and which extend parallel to each other transversely of the apparatus. Frame 7 which is adapted to support a microfiche or card is also formed with cooperating races 24 depending therefrom which engage the rails 22 in such a manner as to support frame 7 via said rails on the frame 8. Frame 9 is movable in the direction of the rail 22, i.e., the "X" axis, relative to frame 8 and frame 7.

Figure 2:
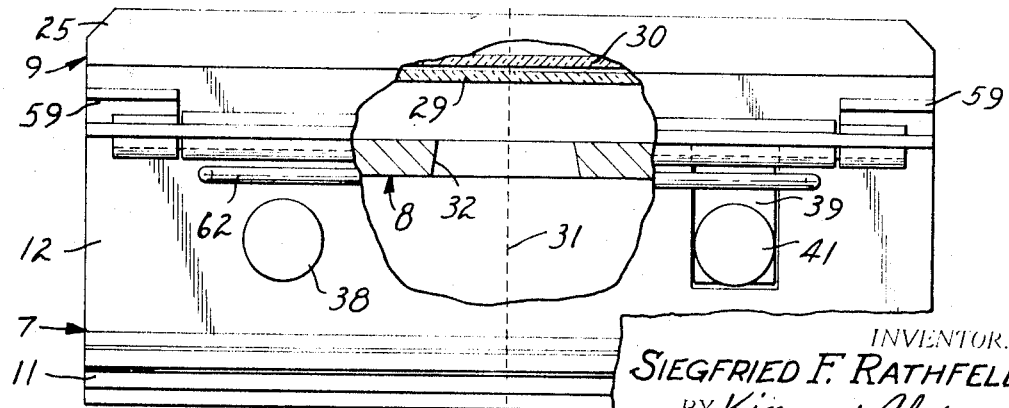
FIG. 2 is a front view of the apparatus of FIG. 1, partly in section, to show interior pieces.

Frame 9 is basically a rectangular frame piece and cover member 25, each of which are formed with an enlarged rectangular central opening 26 and 27 over which are mounted flat transparent plates 29 and 30. A card can be supported between the plates 29 and 30 of the frame 9 to expose the individual frames on a microfiche by movement of the frame 9 along the X and Y axes to register desired ones of said individual frames on the card with an optic axis indicated at 31 in FIGS. 1 and 2. Frame 7 is also a rectangular frame with an enlarged rectangular central opening, and frame 8 is formed with a longitudinally extending slotted aperture 32 through which the optic axis 31 may pass.

Figure 4:
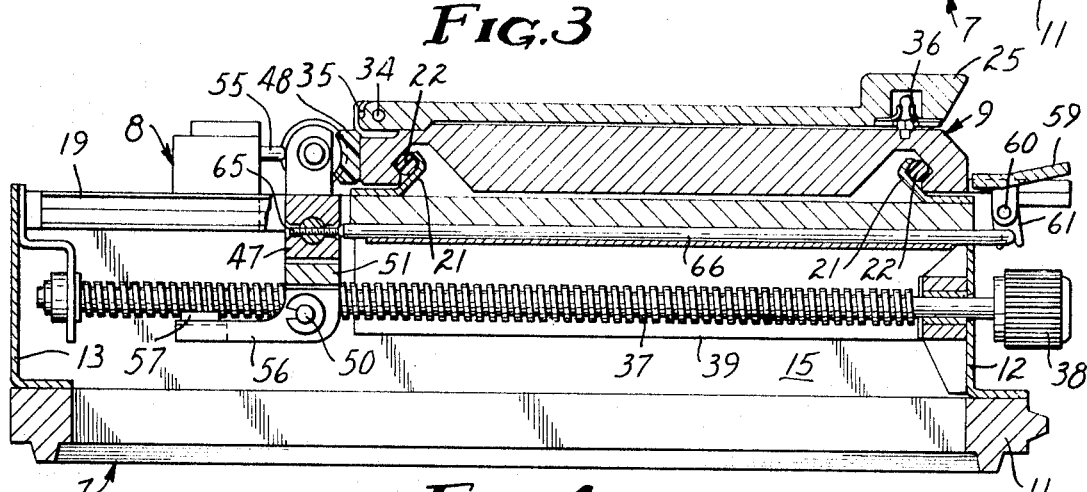
FIG. 4 is a vertical longitudinal sectional view taken generally along line 4—4 of FIG. 1.
Figure 5:
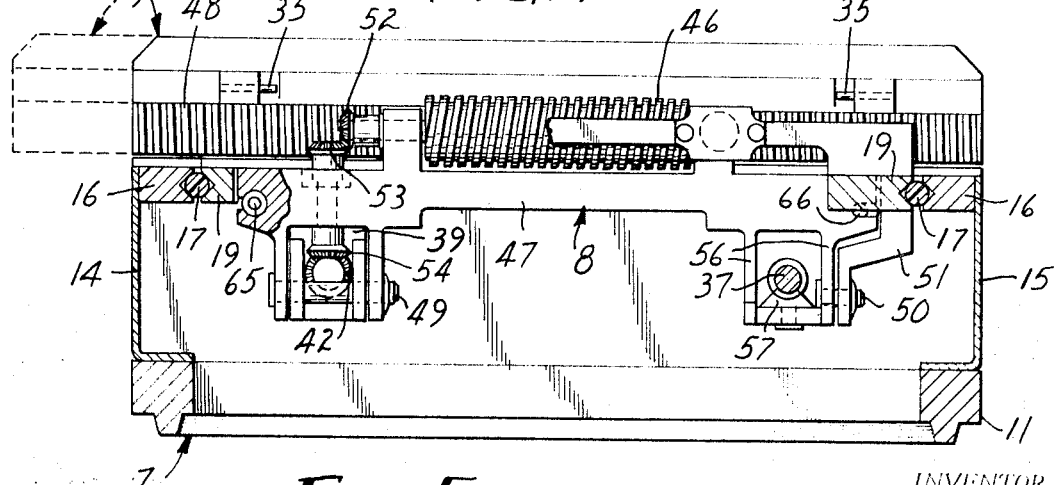
FIG. 5 is a vertical transverse sectional view taken generally along line 5—5 of FIG. 1.

The cover member 25 is pivotally mounted by means of hinge pins 34 and the amount of pivotal movement is controlled by stop pins 35 extending outwardly from the ears of the hinge for the cover member. The cover member is latched in closed position on the frame piece by means of a spring catch 36, as shown in FIG. 4.

The frames 7, 8 and 9 are able to slide relative to each other on the rails 17 and 22 but gear means are provided on the frames affording vernier-type movement of the frames relative to each other along the same guides 17 and 22. The gear means on the support frame 7, the first movable frame 8 and the card supporting or second movable frame 9 are manually actuated to afford the relative vernier-type movement of the frames and means are provided for separating and disabling the gear means to again permit the free-floating action of the frame 9 along the X and Y axes relative to the frames 7 and 8.

The gear means comprise a worm gear 37 supported at opposite ends by the front plate member 12 and rear plate 13 of the support frame 7. This worm gear 37 is driven by a manually operable knob 38 mounted on the end of the shaft supporting the worm gear which extends beyond the front plate 12.

A longitudinally extending guide 39, which is generally rectangular in cross-section, depends from the lower portion of the frame 8 and journals a shaft 40 having on one end thereof, which extends through the guide, a knob 41 and at its opposite end a beveled gear 42. The knob 38 affords movement of the frames 8 and 9 longitudinally on the frame 7 and rotation of the knob 41 affords movement of the frame 9 transversely on the frames 7 and 8. This latter movement is afforded by an additional worm gear 46 supported on a pivotal transversely extending bar 47, which bar is pivoted about pins 49 and 50 supported on one end of the depending guide 39 and on a depending arm 51 supported by the frame 8. The worm gear 46 meshes with an elongated half nut 48 extending transversely across the frame 9 and the worm gear 46 is driven through additional beveled gears 52, 53, and 54 from the beveled gear 42.

Spring driven or biased plungers 55 engage the bar 47 forcing the worm gear 46 into engagement with the elongated half nut extending along the frame 9 and a pair of arms 56, which extend from the pivot pin 50 in the direction opposite the movement of the plungers 55, carry a half nut 57 which is adapted to engage the worm gear 37. The bar is pivoted against the bias of the plungers 55 to separate the worm gear 46 from the elongated half nut 48 and to separate half nut 57 from the worm gear 37 by depressing one of a pair of spaced levers 59 which are secured to a transversely extending shaft 60 journalled on the frame 9. The shaft 60 has a radial arm 61 (see FIG. 4) which has a bifurcated outer edge receiving between the bifurcations the bight portion 62 of a large U-shaped wire having legs 65 and 66 which are slidably received in the frame 8 and have ends connected with bearing members supported by the bar 47, between the pivots therefor and worm gear 46, to force the bar 47 to pivot about the pivot axis moving the worm gear 47 away from the nut 48, and the nut 57 away from the worm gear 37 against the bias of the plungers 55. The radial arm 61 is slidable along the bight portion 62 of the enlarged U-shaped wire member as the frame 9 moves transversely on the frame 8. In any position however depressing either of the spaced levers 59, which form a single selectively operable control member, will disengage the gear member such that the frames 8 and 9 are free-floating relative to each other and the support frame 7.

What is claimed is:

1. A card handling and positioning apparatus for use with a projecting means comprising
   a support frame,
   a first movable frame,
   first guide members on said support frame and on said first frame for supporting said first frame for movement relative to said support frame along a first axis,
   a second movable frame for supporting a card,
   second guide members on said first frame and on said second frame for supporting said second frame on said first frame for movement relative to said first frame along a second axis normal to said first axis,
   gear means including rotatable worm gears and cooperating half nuts on said support frame, said first frame and said second frame affording said relative movement of said frames along said first and second axis upon operation thereof,
   manual means for operating said gear means, and
   means supported on said first movable frame for simultaneously separating said gear means between said support frame and said first frame and between said first frame and said second frame to afford selective free-floating movement between said frames.

2. A card handling and positioning apparatus as described in claim 1 wherein said first and second guide members each comprise
   spaced parallel rails supported by one of said frames, and
   race members supported on the other frame of a relatively movable set of said frames affording sliding movement of the other frame of a set along said rails.

3. A card handling and positioning apparatus for use with a projecting means comprising
   a support frame,
   a first movable frame,
   first guide members on said support frame and on said first frame for supporting said first frame for movement relative to said support frame along a first axis,
   a second movable frame for supporting a card,
   second guide members on said first frame and on said second frame for supporting said second frame on said first frame for movement relative to said first frame along a second axis normal to said first axis,
   gear means including rotatable worm gears and cooperating half nuts on said support frame, said first frame and said second frame affording said relative movement of said frames along said first and second axis upon operation thereof, a said worm gear and a said half nut being pivotally mounted on said first movable frame for simultaneous movement into and out of driving engagement with a said half nut on said second movable frame and a said worm gear on said support frame respectively,
   manual means for operating said worm gears, and
   means for moving said worm gear and said half nut on said first frame to afford selective free-floating movement between said frames.

4. A card handling and positioning apparatus as described in claim 3 wherein said pivotally mounted worm gear and half nut are carried by one pivotal frame, and wherein said means for separating said gear means includes a manually operable lever connected by a sliding connection to said pivotal frame to move said pivotal frame in a direction to separate said worm gear from the other half nut and to separate said half nut thereon from the other worm gear.

* * * * *